//OR 3,759,590

United States Patent
Arnaud

[11] 3,759,590
[45] Sept. 18, 1973

[54] RAY INVERTERS FOR MINIMIZING DELAY DISTORTION IN MULTIMODE OPTICAL FIBERS

[75] Inventor: Jacques Alexis Arnaud, Colts Neck, N.J.

[73] Assignee: Bell Telephone Laboratories, Incorporated, Murray Hill, Berkeley Heights, N.J.

[22] Filed: Sept. 11, 1972

[21] Appl. No.: 288,032

[52] U.S. Cl............. 350/96 WG, 350/54, 350/167, 350/190, 350/191
[51] Int. Cl.......................... G02b 5/14, G02b 27/00
[58] Field of Search ................................ 350/96 WG

[56] References Cited
UNITED STATES PATENTS

| | | | |
|---|---|---|---|
| 3,200,697 | 8/1965 | Goubau | 350/96 WG |
| 3,468,598 | 9/1969 | Ito | 350/96 WG UX |
| 3,614,198 | 10/1971 | Martin et al. | 350/96 WG |

Primary Examiner—John K. Corbin
Attorney—W. L. Keefauver

[57] ABSTRACT

Delay distortion, due to differences in the group velocities of the various modes propagating along a multimode optical fiber, is minimized by the inclusion, along the fiber, or an array of three, equally spaced, converging lenses for inverting the order of the rays representing the various modes. The first and the third of said lenses, whose focal lengths are F/2, have their optical centers located a distance F from the ends of the adjacent fibers, and a distance $F(\theta'_{max}/2)$ from the fiber axis, where $\theta'_{max}$ is the maximum angle at which energy is radiated by the fiber. The center lens, whose focal length is F, is equally spaced a distance F from each of the other two lenses, and has its optical center on the guide axis. The physical configuration of the lenses depends upon the radiation pattern at the end of the particular fiber used.

3 Claims, 10 Drawing Figures

3,759,590

3,759,590

RAY INVERTERS FOR MINIMIZING DELAY DISTORTION IN MULTIMODE OPTICAL FIBERS

The invention relates to delay equalizers for use with multimode optical fibers.

BACKGROUND OF THE INVENTION

Recent advances in the fabrication of ultratransparent materials have demonstrated that fibers are a promising transmission medium for optical communication systems. By using coherent sources and single mode fibers, such systems are theoretically capable of operating at pulse rates of the order of tens of gigahertz.

There are, however, many applications which are preferably optimized with respect to cost and simplicity, rather than speed. Systems of this latter kind would employ incoherent light sources and multimode fibers.

In the copending U.S. Pat. application by E. A. J. Marcatili, Ser. No. 247,448, filed Apr. 28, 1972, there is described an arrangement for coupling an incoherent signal source to a multimode fiber. As noted therein, one of the problems associated with such systems is the delay distortion resulting from the fact that the various modes propagate along a multimode fiber with different group velocities. While means are disclosed by Marcatili for reducing this distortion, it cannot be totally eliminated.

It is, accordingly, the broad object of the present invention to minimize the delay distortion produced in multimode optical fibers.

SUMMARY OF THE INVENTION

As is known, in a multimode optical fiber each of the various propagating modes can be characterized by means of a ray progressing along the fiber at a specific angle to the fiber axis. In particular, the higher order modes propagate at larger angles to the axis and, hence, have a lower resultant propagation velocity along the direction of the fiber axis. Conversely the lower order modes propagate at smaller angles and at correspondingly higher velocities.

In accordance with the present invention, the delay distortion, due to differences in the group velocities of the various modes, is minimized by the inclusion, along the fiber, of an array of three lenses for inverting the order of the rays. Thus, a ray entering the inverter at a large angle is transformed into a small angle ray, while a small angle ray is transformed into a large angle ray. More generally, a ray making an angle $\theta$ with the fiber axis is transformed into a ray at approximately an angle $\theta_{max} - \theta$, where $\theta_{max}$ is the maximum angle that a guided mode makes with the fiber axis. The net effect is to convert the energy in the faster propagating modes into slower propagating modes, and to convert the slower propagating modes into faster propagating modes, such that all the energy propagates more nearly at the same average group velocity.

Each of the specific embodiments to be described comprises an array of three, equally spaced converging lenses. The first and the third of said lenses, whose focal lengths are $F/2$, have their optical centers located a distance $F$ from the ends of the adjacent fibers, and a distance $F\theta'_{max}/2$ from the fiber axis, where $\theta'_{max}$ is the maximum angle at which wave energy is emitted at the end of the fiber. The center lens, whose focal length is $F$, is equally spaced a distance $F$ from each of the other two lenses and has its optical center on the guide axis.

The physical configuration of the lenses depends upon the fiber used. In one embodiment, using a ribbon fiber that is multimode in only one of its transverse directions, cylindrical lenses for focusing along the plane of the fiber are used. In a second embodiment of the invention, using a multimode circular fiber, lenses having circular symmetry are used.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
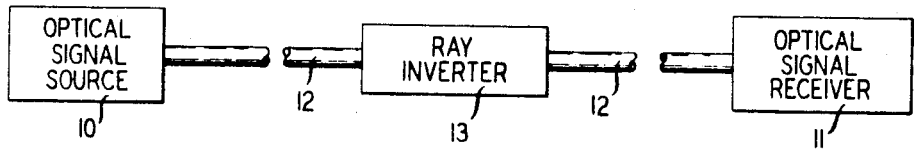
FIG. 1 shows, in block diagram, an optical communication system in which the present invention is employed.

Referring to the drawing, FIG. 1 shows, in block diagram, an optical communication system comprising an optical signal source 10, an optical signal receiver 11, and a multimode optical fiber transmission line 12 coupling the source to the receiver. A ray inverter 13, to be described in greater detail hereinbelow, is located along transmission line 12 and serves to minimize the delay distortion at the receiver 11. While only one inverter is shown, more can be used. If more are considered necessary, an odd number of inverters, equally spaced along line 12 would be employed.

Figure 2:
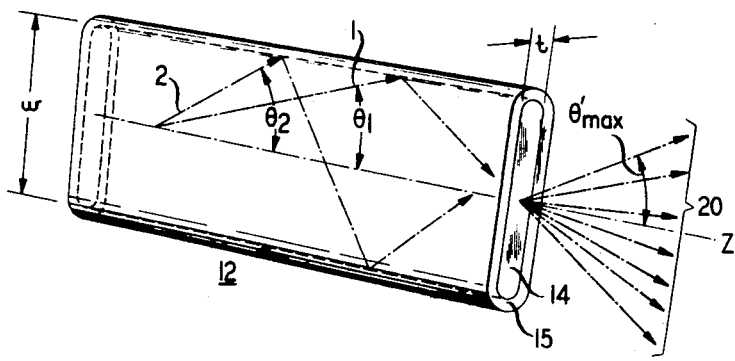
FIG. 2 shows the ray orientation for one embodiment of a multimode transmission line for use in an optical communication system of the type illustrated in FIG. 1.

The present invention relates particularly to the transmission line portion of the system, and to means for equalizing the delay distortion along the line. In this regard, reference is now made to FIG. 2 which shows a portion of line 12 and, in particular, an optical fiber comprising a thin, ribbon-like inner core 14, surrounded by a cladding 15 of lower refractive index. The narrow dimension $t$ of core 14 is selected such that the fiber is supportive of only the fundamental, or lowest order mode along the narrow dimension of the guide. The wide dimension $w$, on the other hand, is much greater than $t$ such that it supports a plurality of modes. For purposes of explanation, two rays 1 and 2 are illustrated in FIG. 2, wherein one of the lower order modes, represented by ray 1, is shown propagating at a very small angle $\theta_1$ to the fiber axis Z—Z, and a higher order mode, represented by ray 2, is shown directed at a relatively larger angle $\theta_2$ to the axis. (Typically, the ray angles would lie within a range between 0.1° and 10°.) Both rays are reflected at the core-cladding interface and, hence, are guided along the fiber. Any higher order modes, whose angles of incidence at the interface are less than critical, are not reflected, and tend to radiate out of the fiber. The maximum ray angle $\theta_{max}$ for a guided mode is given by $$\theta_{max} = \sqrt{2\Delta} \quad (1)$$

where $n$ is the refractive index of the fiber core 14;

$n(1-\Delta)$ is the refractive index of the fiber cladding 15;

and $\Delta$ is a positive number, typically less than 0.1.

At the output end of the fiber, the radiation field lies in the plane of the fiber core, as indicated by the arrows 20, and is concentrated within the triangle formed by the highest order propagating mode. The maximum angle $\theta_{max}$ the radiant energy makes with the fiber axis is given by $$\theta'_{max} = n/n_o \, \theta_{max}; \quad (2)$$

where $n_o$ denotes the refractive index of the surrounding medium.

If $n_o = n$ we have $$\theta'_{max} = \theta_{max} \quad (3)$$

The relative delay, $t$, between any of the higher order modes and the fastest mode is given by $$t = (nL/2c) \, \theta^2 \quad (4)$$

where $L$ equals the line length;

$c$ is the vacuum velocity of light;

and $\theta$ is the ray angle for the particular mode.

From the above, it is apparent that, in the absence of corrective means, components of wave energy associated with the various modes propagating along a multimode fiber will arrive at the output end of the transmission line at different times. In the copending U.S. Pat. application by S. E. Miller and S. D. Personick, Ser. No. 75,383, filed Sept. 25, 1970, assigned to applicant's assignee, it was noted that delay dispersion can be minimized by deliberately introducing "imperfections" along the fiber so as to enhance the mode-to-mode coupling. This has the effect of converting the energy associated with the faster propagating, lower order modes into slower propagating, higher order modes and vice versa. The net result is that all of the energy tends to propagate at approximately the same average group velocity and arrives at the output end of the transmission line at approximately the same time.

The present invention achieves essentially the same result but by discrete means disposed along the optical wavepath rather than by modifying the transmission characteristics of the optical fiber itself. In particular, means are provided for inverting the mode order so that the faster propagating modes are converted into slower propagating modes, and the slower modes are converted into faster modes.

Figure 3:
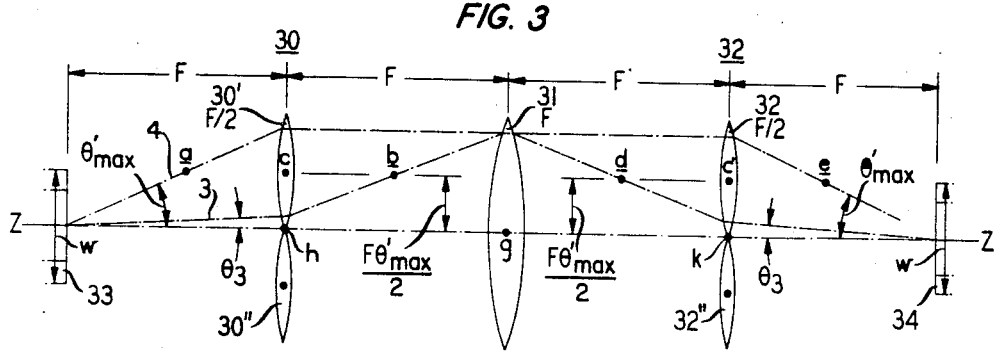
FIG. 3 illustrates the principle of operation of a ray inverter in accordance with the present invention.

FIG. 3, now to be considered, illustrates the principle of operation of a ray inverter in accordance with the present invention. Basically, the ray inverter comprises an array of three, equally spaced converging lenses 30, 31 and 32 disposed between the ends of a pair oflongitudinally spaced, coaxially aligned optical fibers 33 and 34. With reference to FIG. 1, fibers 33 and 34 are merely adjacent segments of transmission line 12.

Each of the lenses 30 and 32 comprise two identical sections, 30', 30'' and 32', 32'', symmetrically disposed with respect to the fiber axis Z—Z. This derives from the symmetry of the radiation pattern at the end of the fibers, as shown in FIG. 2. In the discussion that follows, reference will be made to only one of the lens sections, it being understood that such reference is equally applicable to both.

Lens sections 30' and 32' are converging lenses of focal length F/2, whose centers, $c$ and $c'$, are located a distance F from the nearest adjacent fiber and a distance $F\theta'_{max}/2$ from the fiber axis Z—Z. Points $a$, $b$, and $d$, $e$ are, respectively, the focal points of lenses 30' and 32'.

The center lens 31 is also a converging lens, but of focal length F. Lens 31 is equally spaced a distance F from each of the other lenses, and positioned with its optical center $g$ along the Z—Z axis. The focal points $h$ and $k$ of lens 31 lie along the fiber axis.

For purposes of explanation, two rays 3 and 4, emitted at the output end of fiber 33 are identified in FIG. 3. Ray 3, associated with the lowerst order mode, makes an extremely small angle $\theta_3$ with the fiber axis. Ray 4, on the other hand, representing the highest order mode, makes the maximum angle $\theta_{max}$ with the fiber axis. An insignificant amount of wave energy, directed along the axis, is essentially unaffected by the lens system. Ray 3, however, which is directed at a small angle to the fiber axis, is deflected by lens section 30', passes through focal point $b$, and is redirected by lens 31 along a path that is essentially parallel to the fiber axis. Upon traversing lens section 32', ray 3 is deflected so as to pass through focal point $e$, and into fiber 34 at an angle which is essentially equal to $\theta'_{max}$.

Ray 4, representing the highest order mode passes through focal point $a$ of lens section 30', and is deflected by the latter along a direction that is essentially parallel to the fiber axis. Upon traversing lens 31, ray 4 is deflected such that it passes through focal point $d$ of lens section 32', and is then redirected by the latter so that it enters fiber 34 at a small angle approximately equal to $\theta_3$.

It will be noted that the mode order has been inverted such that ray 4, representing wave energy associated with the slowest propagating mode, has been redirected by the lens array, and now represents wave energy associated with one of the fastest propagating modes. Conversely, ray 3 representing the fastest propagating mode is converted into the slowest propagating mode. Similarly, all the intermediate modes are likewise inverted such that a mode, entering the lens system at an angle $\theta$, is inverted so that it leaves the system at an angle $\theta_{max} - \theta$, and vice versa.

Figure 4:
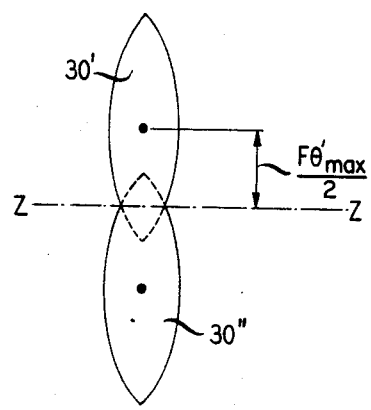
FIG. 4 shows, in greater detail, structural features of two of the lenses used in the ray inverter.

While no mention was made of the size of the several lenses, it is apparent that each should be sufficiently large to intercept all of the energy radiated by the input fiber. Thus, each lens should extend at least a distance $F\theta'_{max}$ above and below the fiber axis. In FIG. 3, the diameters of lens sections 30' and 30'' of lens 30, and lens sections 32' and 32'' of lens 32, are shown to be just equal to the minimum specified. Advantageously, however, the lens sections should be made larger than the minimum for structural reasons. For example, in FIG. 3 the lens sections are shown meeting at a point at the axis. By making them larger, as illustrated in FIG. 4, they will have some finite thickness along the axis, resulting in a stronger structure. The dotted lens portions, shown in FIG. 4, represent that portion of each lens section which merges into the other since the optical centers of the two lens sections remain at a distance $F\theta'_{max}/2$ from the fiber axis in all cases.

Figure 5:
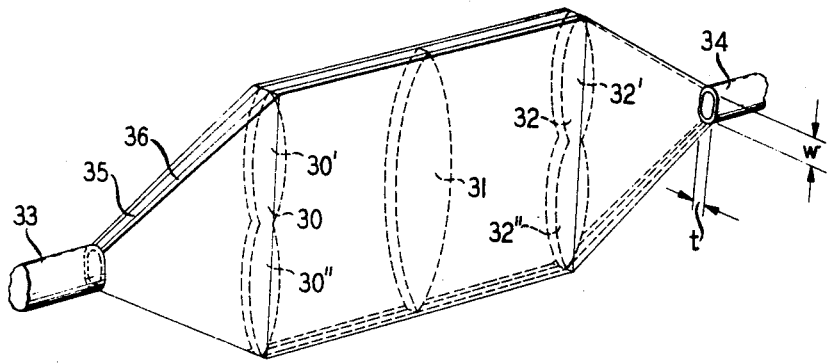
FIG. 5 shows, in perspective, the details of a ray inverter for use with thin ribbon fibers.

Using the same identification numerals as in FIG. 3, the ray inverter for a ribbon fiber transmission line is shown in perspective in FIG. 5. Since, as explained hereinabove, the ribbon fiber is multimode in only one of its transverse dimensions, delay equalization is only required along the one direction. Hence, each of the lenses 30, 31 and 32 can be a cylindrical lens which provides the above-described focusing action in only the plane of the fiber core, while confinement of the beam in the narrow dimension is insured by the continuation of the fiber core material and the cladding material throughout the system.

Thus, each of the lenses 30 and 32 comprises two identical lens sections 30', 30'' and 32', 32'', symmetrically disposed to either side of the fiber axis. The optical center of each lens section lies along a line perpendicular to the wide dimension of the fibers at a distance $F\theta'_{max}/2$ from the axis.

Lens 31 comprises a single section lens whose optical center lies along a line which passes through the fiber axis along a direction perpendicular to the wide dimension of the fiber.

The region between lenses, and between the fibers and the lenses is filled with core material 35, surrounded by cladding material 36, for guidance along the narrow dimension of the fiber. The lenses, embedded as they are within the core material, would be made of a material having a higher refractive index than the core material.

Figure 6:
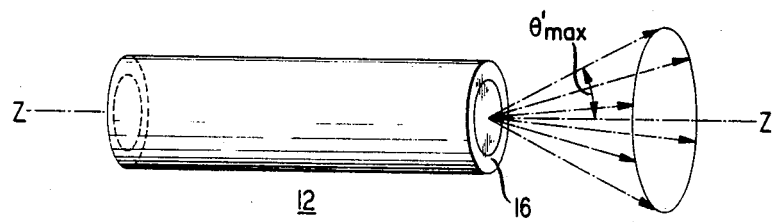
FIG. 6 shows the radiation field at one end of a circular core, multimode optical fiber.
Figure 7:
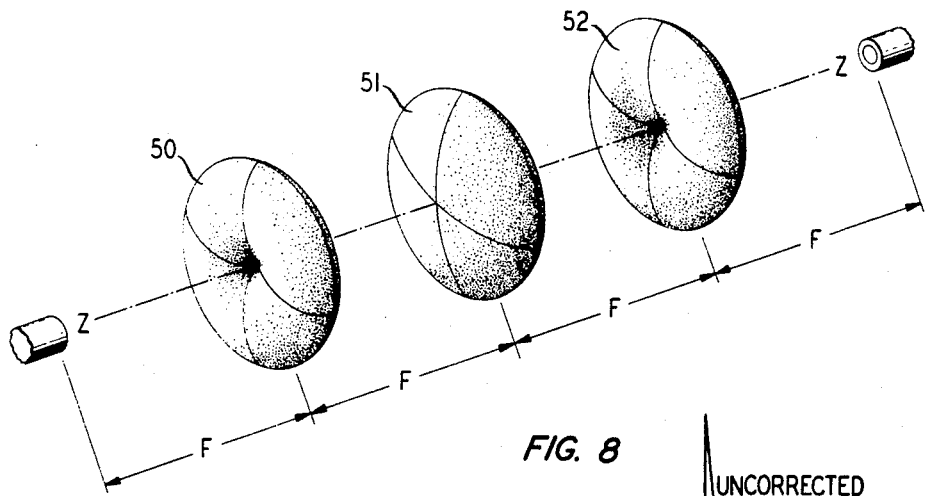
FIG. 7 shows, in perspective, the details of a ray inverter for use with a circular core fiber.

In the more general case of a circular core optical fiber, such as is illustrated in FIG. 6, the symmetry of the core 16 is such that the fiber is multimode along all transverse directions. In this latter case, the radiation field at the end of the fiber is concentrated with the cone formed by the highest order propagating mode. Thus, lenses 30, 31 and 32 must have circular symmetry in order to redirect the cone of rays representing each of the propagating modes. For this more general case, the arrangement shown in FIG. 3 is merely an axial cross-section of the complete lens system which is formed by rotating the lens sections shown about the axis Z—Z. The resulting three dimensional lens system, shown in perspective in FIG. 7, comprises two toroidal-like lenses 50 and 52, of focal lengths F/2, whose physical centers lie along the fiber axis and whose optical centers lie along a circle of radius $F\theta'_{max}/2$. The third lens 51 is a spherical lens, of focal length F, whose physical and optical centers lie along the fiber axis.

It is important to note that in the above-described arrangements, the end of fiber 33 is imaged with magnification unity, onto the end of fiber 34 and, consequently, no ray is lost in principle. (This is strictly true only for a point on the fiber axis. However, because the fiber core is so much smaller than the lenses, it is approximately true for all points on the core.) Another interesting feature of the system is that it is free of coma aberration and distortion as a result of its symmetry. This is important because the centers of lenses 30 and 32 are off-set. The other aberrations of the lenses are corrected by conventional means, similar to those used with microscope objectives.

The improvement to be expected by this system can be evaluated as follows:

The group delay for any ray propagating along a fiber of length $L$ and refractive index $n$ is given by $$t = Ln/c\,(1 + \theta^2/2) = \tau + \alpha\theta^2 \tag{5}$$

where
 $\theta$ is the ray angle;
 $\tau$ and $\alpha$ are constants.
Thus, the delay, $t$, is proportional to $\theta^2$.

The power, $dP$, radiated from an isotropic point source between a cone with apex angle $\theta$ and a cone with apex angle $\theta + d\theta$ is proportional to $$dP = 2\theta \cdot d\theta = d(\theta^2) = dt \tag{6}$$

or $$dP/dt = 1. \tag{7}$$

Figure 8:
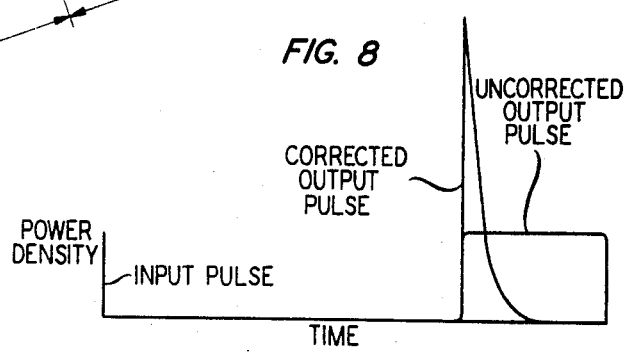
FIG. 8 shows the effects of delay distortion on an input pulse, and the improvement to be realized by using a ray inverter in accordance with the present invention.

Therefore, if an infinitely narrow pulse is launched into an uncorrected multimode optical fiber, the pulse deteriorates into a rectangular pulse of width $\theta^2_{max}$, as shown in FIG. 8, the dispersion of the material (i.e., as a function of frequency) being neglected.

Assuming that one equalizer is introduced at midpoint along the fiber, the total delay for the ray radiated at angle $\theta$ is, according to equation (3), proportional to $$t = 1/2\,\theta^2 + 1/2\,(\theta - \theta_{max})^2 \tag{8}$$

$$t = (\theta - \theta_{max}/2)^2 + \theta^2_{max}/4. \tag{9}$$

Omitting the constant $\theta^2_{max}/4$, the important term is $(\theta - \theta_{max}/2)^2$, which is to be compared to the factor $\theta^2$ obtained without equalization. Substituting in (5), we obtain $$dP/dt = 1/2 = (\theta_{max}/4)\,t\ . \tag{10}$$

Since $dP/dt \rightarrow \infty$ when $t \rightarrow 0$, the front edge of the pulse is preserved, resulting in a corrected pulse as illustrated in FIG. 8.

Figure 9:
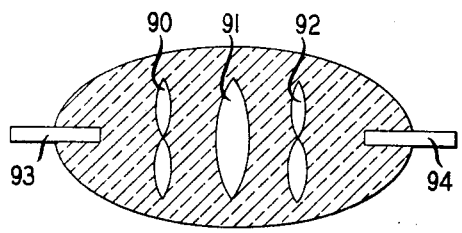
FIGS. 9 and 10 show, by way of example, two ways in which a ray inverter can be fabricated.

Ray inverters of the type described hereinabove can be fabricated in a variety of different ways. In one arrangement, illustrated in FIG. 9, the three lenses 90, 91 and 92, and a pair of fiber segments 93 and 94 are assembled and encapsulated at the factory as a single unit, which is then spliced into the fiber transmission line using such splicing techniques as are disclosed, for example, in the copending U.S. Pat. application by E. A. J. Marcatili, Ser. No. 262,002, filed June 12, 1972, or in the copending U.S. Pat. application by R. F. Trambarulo, Ser. No. 239,034, filed Mar. 29, 1972, and assigned to applicant's assignee.

Figure 10:
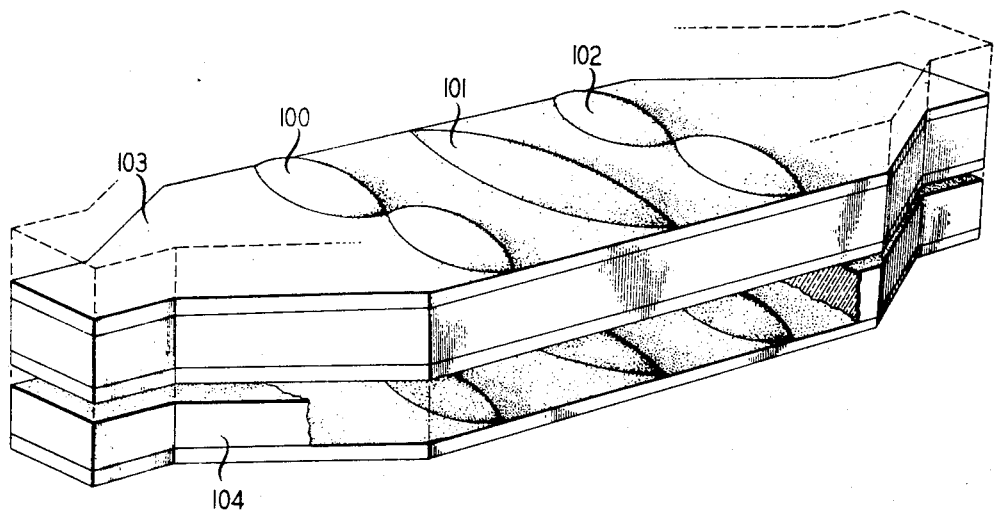

A two-dimensional form of a ray inverter for use with ribbon fibers, of the type shown in FIG. 2, can be realized by integrated optics techniques. It is well known that the phase velocity of a wave guided by a thin film deposited on a substrate of lower refractive index decreases as the thickness of the film increases, and that focusing effects can be realized by shaping the film thickness. (See, for example, "Solid-State Self-Focusing Surface Waveguide (Microguide)" by Jun-ichi Nishizawa and Skira Otsuka, Applied Physics Letters, July 15, 1972, p. 48.) Thus, an integrated ray inverter constructed in accordance with these techniques would appear as illustrated in FIG. 10 wherein the thicker film regions 100, 101 and 102 form the lens of the ray inverter. The film 103, deposited on a substrate 104 of cladding material, is typically of the order of 3 $\mu$m thick along the regions of uniform thickness and about 1 mm wide. The thickness increases to about 5 $\mu$m in the regions of the lenses. The use of integrated optic techniques makes it very easy and convenient to stack together a plurality of such structures for use in multichannel systems.

In all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A delay equalizer for coupling optical wave energy between the ends of two longitudinally spaced, coaxially aligned, multimode optical fibers comprising:

a sequence of three converging lenses equally spaced along the region between said fibers;

the first and the third of said lenses, having focal lengths F/2, disposed with their optical centers located a distance F from the adjacent fiber ends and a distance $F\theta'_{max}/2$ away from the fiber axis, where $\theta'_{max}$ is the maximum angle at which wave energy, corresponding to the highest order propagating mode, is emitted at the end of said fiber;

and the second of said lenses, having a focal length F, disposed with its optical center located along said fiber axis a distance F from each of said other lenses.

2. The equalizer according to claim 1 wherein said fibers include an inner core having a narrow dimension supportive of only a single mode of wave propagation, and a wide dimension supportive of a plurality of propagating modes;

wherein said first and third lenses comprise two identical sections, each of which has an optical center which lies along a line perpendicular to the wide dimension of said fiber core;

and wherein said second lens is a cylindrical lens whose optical center lies along a line which intersects the fiber axis along a direction perpendicular to the wide dimension of said fiber.

3. The equalizer according to claim 1 wherein said fibers include a circular inner core supportive of a plurality of propagating modes;

wherein said first and third lenses are toroidal-like lenses whose physical centers lie along the fiber axis, and whose optical centers lie along a circle of radius $F\theta'_{max}/2$;

and wherein said second lens is a spherical lens whose physical and optical centers lie along the fiber axis.

* * * * *